(12) United States Patent
Hirose et al.

(10) Patent No.: US 7,756,605 B2
(45) Date of Patent: Jul. 13, 2010

(54) FLOOR REACTION DETECTOR OF LEGGED MOBILE ROBOT

(75) Inventors: Masato Hirose, Wako (JP); Hiroshi Gomi, Wako (JP)

(73) Assignee: Honda Giken Kogyo Kabushiki Kaisha, Minato-ku, Tokyo (JP)

( * ) Notice: Subject to any disclaimer, the term of this patent is extended or adjusted under 35 U.S.C. 154(b) by 1467 days.

(21) Appl. No.: 10/487,892

(22) PCT Filed: Aug. 15, 2002

(86) PCT No.: PCT/JP02/08299

§ 371 (c)(1),
(2), (4) Date: Feb. 26, 2004

(87) PCT Pub. No.: WO03/022533

PCT Pub. Date: Mar. 20, 2003

(65) Prior Publication Data

US 2004/0238240 A1    Dec. 2, 2004

(30) Foreign Application Priority Data

Aug. 28, 2001    (JP)    ............................. 2001-258144

(51) Int. Cl.
*G06F 19/00* (2006.01)
(52) U.S. Cl. .......................................... 700/245; 901/1
(58) Field of Classification Search ...................... 36/37;
267/140; 700/260, 258, 900, 246, 251, 247,
700/249, 253, 250; 701/124; 702/43; 623/56,
623/53; 414/730, 734; 901/1, 2, 9, 33, 46,
901/47, 48; 318/568.22, 568.2, 568.17, 568.11,
318/568.1, 567; 180/8.1, 8.6
See application file for complete search history.

(56) References Cited

U.S. PATENT DOCUMENTS

| 5,029,483 A |   | 7/1991  | Gautschi et al. |         |
|-------------|---|---------|-----------------|---------|
| 5,255,753 A | * | 10/1993 | Nishikawa et al.| 180/8.6 |

(Continued)

FOREIGN PATENT DOCUMENTS

EP    0 360 923    4/1990

(Continued)

*Primary Examiner*—Khoi Tran
*Assistant Examiner*—Nicholas Kiswanto
(74) *Attorney, Agent, or Firm*—Squire, Sanders & Dempsey L.L.P.

(57) ABSTRACT

In a legged mobile robot having at least a body and a plurality of legs each connected to the body through a first joint and a foot each connected to a distal end of each of the legs through a second joint, a floor reaction force detector is installed between the second joint and a contact end of the foot. More specifically, an upper portion of the floor reaction force detector is connected at a location near the second joint, and the contact end of the foot or thereabout is constituted by a spring mechanism that is lower in rigidity than a member constituting the second joint or thereabout such that a lower portion of the floor reaction force detector is connected to the contact end through the spring mechanism. With this, it becomes possible to provide the floor reaction force detector that can improve detection accuracy of the floor reaction force and prevent the performance of control from being degraded, while enabling to maintain a stable posture during standing and to decrease the impact at foot landing.

10 Claims, 8 Drawing Sheets

U.S. PATENT DOCUMENTS

| | | | |
|---|---|---|---|
| 5,357,696 A * | 10/1994 | Gray et al. | 36/136 |
| 5,416,393 A * | 5/1995 | Gomi et al. | 318/568.2 |
| 5,421,426 A * | 6/1995 | De Beaucourt et al. | 180/8.1 |
| 5,455,497 A * | 10/1995 | Hirose et al. | 318/568.12 |
| 5,500,635 A * | 3/1996 | Mott | 340/323 R |
| 5,551,525 A * | 9/1996 | Pack et al. | 180/8.6 |
| 5,737,217 A * | 4/1998 | Nishikawa et al. | 700/56 |
| 5,765,300 A * | 6/1998 | Kianka | 36/139 |
| 5,813,148 A * | 9/1998 | Guerra | 36/137 |
| 5,841,258 A * | 11/1998 | Takenaka | 318/568.12 |
| 6,243,623 B1 * | 6/2001 | Takenaka et al. | 700/245 |
| 6,280,045 B1 * | 8/2001 | Anteby et al. | 362/103 |
| 6,377,014 B1 * | 4/2002 | Gomi et al. | 318/568.12 |
| 6,493,606 B2 * | 12/2002 | Saijo et al. | 700/245 |
| 6,553,692 B1 * | 4/2003 | Chung | 36/37 |
| 6,578,291 B2 * | 6/2003 | Hirsch et al. | 36/132 |
| 6,580,969 B1 * | 6/2003 | Ishida et al. | 700/245 |
| 6,751,891 B2 * | 6/2004 | Lombardino | 36/28 |
| 7,059,067 B2 * | 6/2006 | Geer et al. | 36/25 R |
| 7,153,242 B2 * | 12/2006 | Goffer | 482/66 |
| 2001/0034957 A1 * | 11/2001 | Doerer et al. | 36/35 R |
| 2002/0088083 A1 * | 7/2002 | Takizawa | 16/45 |
| 2002/0094919 A1 * | 7/2002 | Rennex et al. | 482/124 |
| 2002/0120362 A1 * | 8/2002 | Lathan et al. | 700/245 |
| 2003/0109959 A1 * | 6/2003 | Tajima et al. | 700/245 |
| 2004/0133284 A1 * | 7/2004 | Christensen | 623/24 |
| 2004/0162623 A1 * | 8/2004 | Phillips | 623/55 |
| 2004/0226192 A1 * | 11/2004 | Geer et al. | 36/102 |
| 2004/0231193 A1 * | 11/2004 | Meschan | 36/25 R |
| 2006/0213081 A1 * | 9/2006 | Geer et al. | 36/25 R |
| 2009/0030530 A1 * | 1/2009 | Martin | 623/53 |

FOREIGN PATENT DOCUMENTS

| | | |
|---|---|---|
| EP | 360923 A1 | 4/1990 |
| WO | WO 98/33629 | 8/1998 |
| WO | WO 99/54095 | 10/1999 |

* cited by examiner

FLOOR REACTION DETECTOR OF LEGGED MOBILE ROBOT

TECHNICAL FIELD TO WHICH THE INVENTION RELATES TO

This invention relates to a floor reaction force detector of a legged mobile robot.

BACKGROUND ART OF THE INVENTION

In legged mobile robots, in particular, in biped mobile robots, the floor reaction force detector such as a six-axis force sensor is used to detect the floor reaction force acting on the robot from a floor surface which the robot contacts and based on the detect a floor reaction force, control is appropriately conducted to achieve stable walking. In order to improve detection accuracy, the floor reaction force detector should preferably be installed at a position close to a floor contact end of the feet. In view of this, a technique mentioned in Japanese Laid-Open Patent Application No. 2000-254888 proposes to install the floor reaction force detector at the sole of foot such that the floor reaction force detector contacts a floor surface directly.

However, in this prior art, since the floor reaction force detector contacts a floor surface directly, it has a drawback that rigidity of the detector need be enhanced. The feet of legged mobile robots, in particular, biped mobile robots should preferably have not only appropriate rigidity enough for enabling to maintain a stable posture during standing, but also appropriate elasticity for enabling to absorb and mitigate the impact at landing of a free leg.

Accordingly, if the feet of the prior art are given appropriate rigidity, from the necessity of structure, a portion above the floor reaction force detector, i.e., a portion close to the robot body must have elasticity. However, if the portion above the floor reaction force detector is provided with elasticity, since the floor reaction force to be detected by the floor reaction force detector is absorbed by that portion, the detected floor reaction force may differ from the force that actually acts on the robot, thereby disadvantageously degrading the performance of control mentioned above.

DISCLOSURE OF THE INVENTION

A first object of the invention is to eliminate the drawbacks of the above-mentioned prior art, and to provide a floor reaction force detector of a legged mobile robot which can improve detection accuracy so as not to degrade the performance of control, and can decrease influence of the impact generated at foot landing, while enabling to maintain a stable posture at standing.

Aside from the above, in the legged mobile robots, in particular, in the biped mobile robots, since the foot of a free leg normally lands from its heel, the impact tends to concentrate on the heel or thereabout. Therefore, the heel is likely to deteriorate and as a result, the impact-absorbing effect at foot landing decreases in the course of time. This may degrade posture stability and detection accuracy of the floor reaction force.

Further, in the biped mobile robots, in particular, it is preferable to make the area of a foot portion outer than the leg center line larger than that of a portion inner than the leg center line, so as to prevent the inner foot portion from interfering with another leg or foot and to improve posture stability. However, if the feet are configured in this manner, the outer foot portion encounters more load or spinning moment due to free leg swinging. With this, the outer foot portion is apt to deteriorate and this will also degrade the posture stability and detection accuracy of the floor reaction force.

A second object of the invention is to provide a floor reaction force detector of a legged mobile robot which can enhance the durability of a foot portion outer than the leg center line so as to prevent the impact-absorbing effect at foot landing from decreasing in the course of time, whereby enabling to avoid the degradation of the posture stability and detection accuracy of the floor reaction force.

Further, from the standpoint of miniaturizing or downsizing of the legged mobile robots, an inner space of the foot can play a significant role in accommodating equipments including a control device. However, if a device such as the control device is accommodated in the inner space of the foot in which the floor reaction force detector is to be installed together, there may be a possibility that current flow in the device influences on the floor reaction force detector through a foot frame as a noise. Moreover, when an electric motor is installed at the ankle joint or thereabout to drive the same, there may be a similar possibility that current flow in the electric motor influences on the detector.

A third object of the invention is to provide a floor reaction force detector of a legged mobile robot which can prevent the floor reaction force detector from being influenced by equipment such as a control device or an electric motor located adjacent thereto.

In order to achieve these objects, as recited in claim 1 mentioned below, the invention provides a floor reaction force detector of a legged mobile robot having at least a body and a plurality of legs each connected to the body through a first joint, for detecting the floor reaction force acting from a floor surface through a contact end of each foot connected to a distal end of each of the legs through a second joint, characterized in that: the floor reaction force detector is installed between the second joint and the contact end of the foot.

Since the floor reaction force detector is installed between the second joint (more specifically, an ankle joint) and the contact end of the foot, the detector can thus be installed at a position closer to a floor contact surface, detection accuracy is accordingly improved. In addition, since the contact end of the foot is interposed between the detector and the floor surface, it becomes possible to decrease influence of the impact at foot landing, and it becomes unnecessary to enhance rigidity of the detector.

As recited in claim 2 mentioned below, the invention is arranged such that, one end of the floor reaction force detector is connected at a location near the second joint, and the contact end of the foot or thereabout is constituted by a member that is lower in rigidity than a member constituting the second joint or thereabout, such that other end of the floor reaction force detector is connected to the member having the lower rigidity.

Since one end of the floor reaction force detector is connected at a location near the second joint, and the contact end of the foot or thereabout is constituted by a member that is lower in rigidity than a member constituting the second joint or thereabout, such that the other end of the floor reaction force detector is connected to the member having the lower rigidity, the foot can have appropriate elasticity, thereby enabling to decrease influence of the impact at foot landing. Since a portion below the detector can have elasticity, while a portion above the detector (i.e., a portion closer to the body) can have high rigidity, this can further improve detection accuracy and does not degrade the performance of control, since the detected floor reaction force is equal to the floor reaction force actually acting on the robot.

As recited in claim 3 mentioned below, the invention is arranged such that, the member having the lower rigidity comprises a spring mechanism, and the floor reaction force detector is connected to the contact end of the foot through the spring mechanism.

Since the member having the lower rigidity comprises a spring mechanism, and the floor reaction force detector is connected to the contact end of the foot through the spring mechanism, it becomes possible to achieve the same effects and advantages as those mentioned above. Since the spring mechanism is, more specifically, constituted as mentioned below, it becomes possible to decrease or mitigate the impact at foot landing acting even from an inclined or slanted direction, while enabling to maintain a posture stability during standing (pause).

As recited in claim 4 mentioned below, the invention is arranged such that, the spring mechanism includes at least two of elastic members, and the floor reaction force detector is installed between the at least two of elastic members.

Since the spring mechanism includes at least two of elastic members, and the floor reaction force detector is installed between the at least two of elastic members, it becomes possible to further improve detection accuracy of the floor reaction force.

As recited in claim 5 mentioned below, the invention is arranged such that, the at least two of elastic members are arranged in such a manner that they have a predetermined positional relationship with each other in a direction in which the robot advances, and the floor reaction force detector is installed between the elastic members arranged to have the predetermined positional relationship with each other.

Since the at least two of elastic members are arranged in such a manner that they have a predetermined positional relationship with each other in a direction in which the robot advances, and the floor reaction force detector is installed between the elastic members arranged to have the predetermined positional relationship with each other, it becomes possible to enhance the posture stability during standing in the advancing direction (front-and-back direction) and to further improve detection accuracy of the floor reaction force.

As recited in claim 6 mentioned below, the invention is arranged such that, the at least two of elastic members are arranged in such a manner that they have a predetermined positional relationship with each other in a direction that orthogonally intersects the direction in which the robot advances and a direction of gravity, and the floor reaction force detector is installed between the elastic members arranged to have the predetermined positional relationship with each other.

Since the at least two of elastic members are arranged in such a manner that they have a predetermined positional relationship with each other in a direction that orthogonally intersects the direction in which the robot advances and a direction of gravity, and the floor reaction force detector is installed between the elastic members arranged to have the predetermined positional relationship with each other, it becomes possible to enhance the posture stability during standing in the direction that orthogonally intersects the advancing direction and the direction of gravity (i.e., the right-and-left direction) and to further improve detection accuracy of the floor reaction force.

As recited in claim 7 mentioned below, the invention is arranged such that, the spring mechanism includes n (n≧3) numbers of elastic members, and the floor reaction force detector is installed at a center of gravity of n-sided polygon whose vertexes are formed by the elastic members, when viewed from a sole of the foot.

Since the spring mechanism includes n (n≧3) numbers of elastic members, and the floor reaction force detector is installed at a center of gravity of n-sided polygon whose vertexes are formed by the elastic members, when viewed from a sole of the foot, it becomes possible to absorb the load (floor reaction force) acting from any direction in a same or uniform manner, the posture stability is improved and detection accuracy of the floor reaction force is further enhanced.

As recited in claim 8 mentioned below, the invention is arranged such that, one of the elastic members located at a position rearwards from the floor reaction force detector in a direction in which the robot advances, is made higher in rigidity than that located at a position forwards from the floor reaction force detector in that direction.

Since one of the elastic members located at a position rearwards from the floor reaction force detector in a direction in which the robot advances, is made higher in rigidity than that located at a position forwards from the floor reaction force detector in that direction, the rigidity of the heel or thereabout is improved and the impact-absorbing effect is accordingly prevented from decreasing in the course of time, thereby enabling to avoid the degradation of the posture stability and floor reaction force detection accuracy.

As recited in claim 9 mentioned below, the invention is arranged such that, one of the elastic members located at a position outer than the floor reaction force detector in a direction which orthogonally intersects the direction in which the robot advances and a direction of gravity, is made higher in rigidity than that located at a position inner than the floor reaction force detector in that direction.

Since one of the elastic members located at a position outer than the floor reaction force detector in a direction which orthogonally intersects the direction in which the robot advances and a direction of gravity, is made higher in rigidity than that located at a position inner than the floor reaction force detector in that direction, the rigidity of the outer foot portion is improved and the impact-absorbing effect is accordingly prevented from decreasing in the course of time, thereby enabling to avoid the degradation of the posture stability and floor reaction force detection accuracy.

As recited in claim 10 mentioned below, the invention is arranged such that, an insulator is disposed around the floor reaction force detector.

Since an insulator is disposed around the floor reaction force detector, the detector can be protected from the influence of current flow in a control device and an electric motor disposed thereabout.

DETAILED DESCRIPTION OF THE PREFERRED EMBODIMENTS

A floor reaction force detector of a legged mobile robot according to the embodiments will be explained with reference to the accompanied drawings.

Figure 1:
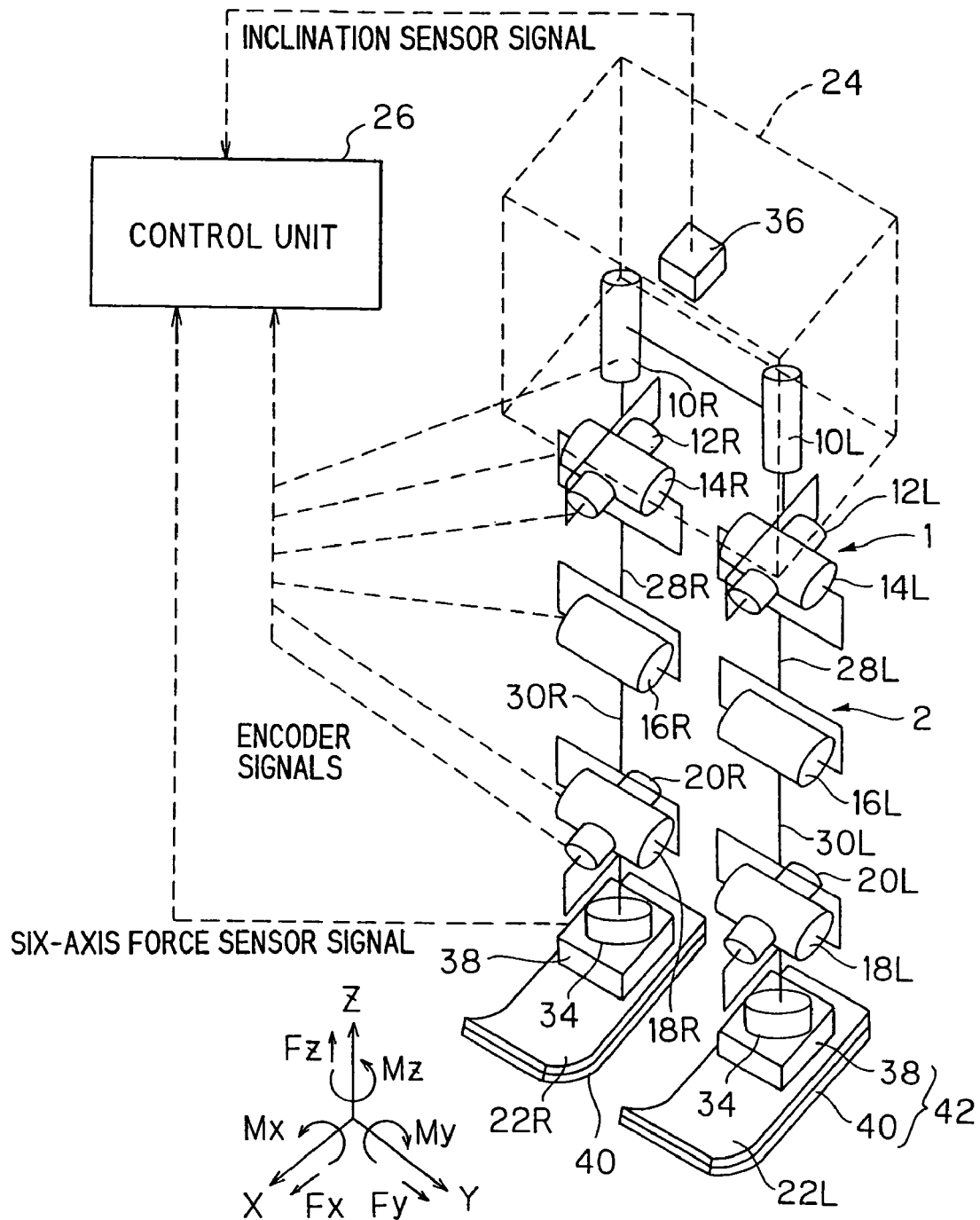
FIG. 1 is a schematic view showing an overall configuration of a legged mobile robot, more particularly a biped mobile robot, to which a floor reaction force detector of a legged mobile robot according to an embodiment of the invention is applied.

FIG. 1 is an overall schematic view showing a legged mobile robot, more specifically a biped mobile robot to which the floor reaction force detector according to the embodiment is applied.

As illustrated in the figure, a biped mobile robot (hereinafter simply referred to "robot") 1 has a pair of right and left legs (leg links) 2 each composed of six joints. The six joints include, arranged successively downward, a pair of hip joints 10R, 10L (the right-hand joint is indicated by R and the left-hand joint by L) for rotating legs with respect to hips (about a Z-axis), a pair of hip joints 12R, 12L in the rolling axis (about an X-axis), a pair of hip joints 14R, 14L in the pitching axis (about a Y-axis), a pair of knee joints 16R, 16L in the pitching axis, a pair of ankle joints 18R, 18L in the pitching axis, and a pair of joints 20R, 20L in the rolling axis.

The robot is provided with feet 22R, 22L underneath of the joints 18R(L) and 20R(L), and a body (trunk) 24 at its top which accommodates a control unit 26 comprising a microcomputer. In the above, the joints 10R(L), 12R(L), 14R(L) make up the hip joints (or waist joints; the aforesaid first joint), and the joints 18R(L), 20R(L) make up the ankle joints (foot joints; the aforesaid second joint). The hip joints and knee joints are connected to each other by thigh links 28R, 28L, and the knee joints and ankle joints are connected to each other by crus or shank links 30R, 30L.

With the above structure, each of the legs 2 is given six degrees of freedom. When the 6×2=12 joints are driven to suitable angles during walking, a desired motion is imparted to the entire leg structure to enable the robot to walk arbitrarily in an environment of three-dimensional (absolute) space.

As shown in the figure, a known six-axis force sensor (floor reaction force detector) 34 is disposed at a position between each ankle joint 18R(L), 20R(L) and a contact end of each foot 22R(L), and measures three directional components Fx, Fy, Fz of force and three directional components Mx, My, Mz of moment of the force and detects the presence or absence of foot landing (floor contact) and the floor reaction force (floor contact load) acting from a floor surface (not shown). Moreover, the body 24 has an inclination sensor 36 which detects the inclination and its angular velocity with respect to the Z-axis (the vertical direction (the direction of gravity)). Electric motors of the respective joints are coupled with respective rotary encoders (not shown) that detect the rotation amounts of the electric motors.

Outputs generated by these sensors including the six-axis force sensor 34 are inputted to the control unit 26. The control unit 26 calculates or determines joint displacement commands based on the inputted detected values in accordance with data stored in a memory (not shown) and moves the aforesaid drive joints.

A spring mechanism 38 (explained later in detail) is installed at a position between the six-axis force sensor 34 and the contact end of each feet 22R(L), whilst a sole member 40 is attached to the sole of each foot 22R(L). The spring mechanism 38 constitutes a compliance mechanism 42 together with the sole member 40. When the floor reaction force acts on each foot 22R(L), the spring mechanism 38 and the sole member 40 of the compliance mechanism 42 deform or bend to displace the foot 22R(L), thereby absorbing or mitigating impact at foot landing.

The structure of the foot 22R(L), more specifically the structure of the six-axis force sensor 34 and other components thereabout will be explained in detail with reference to FIG. 2.

Figure 2:
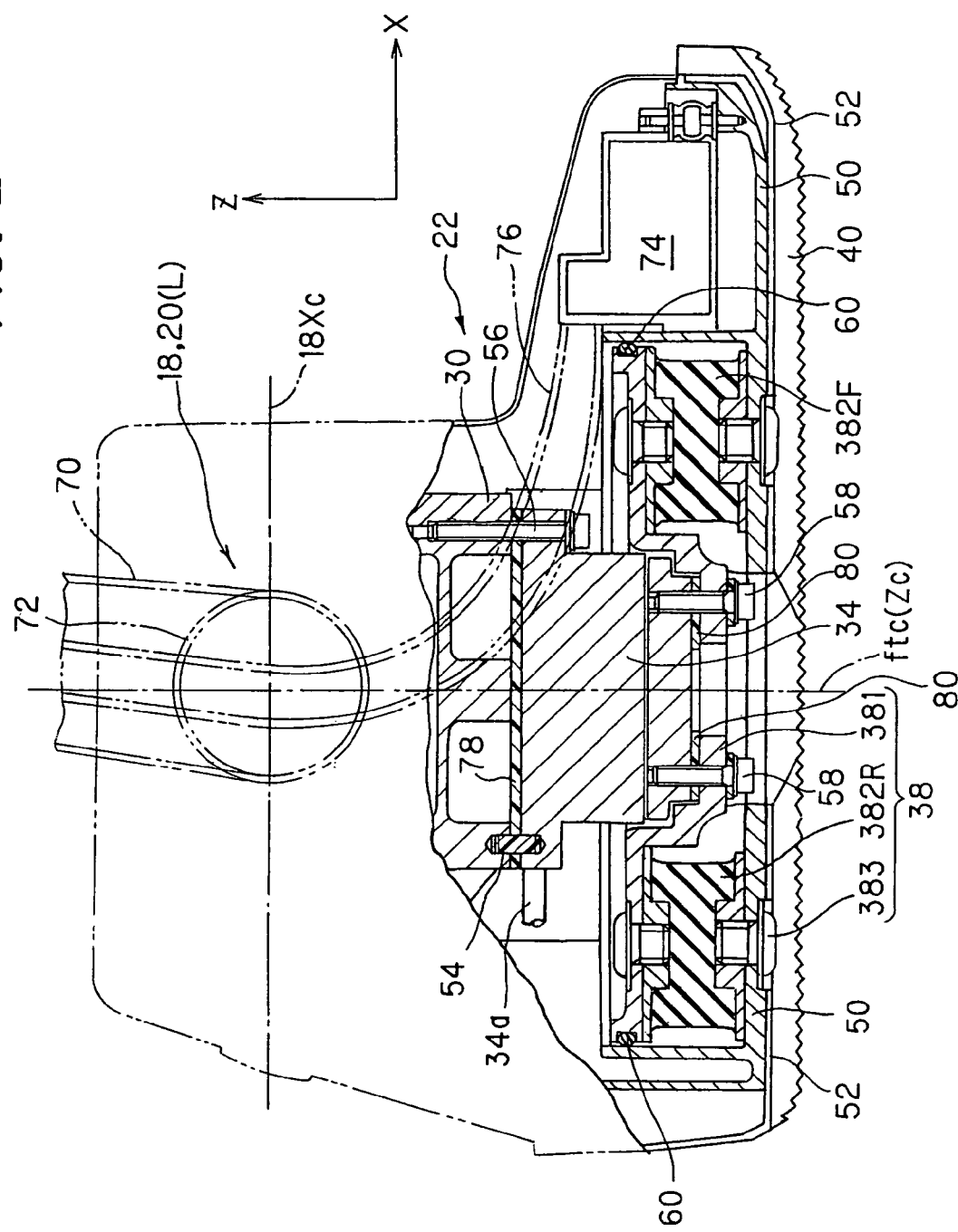
FIG. 2 is an enlarged cross-sectional side view showing the structure of a foot of the legged mobile robot illustrated in FIG. 1.
Figure 3:
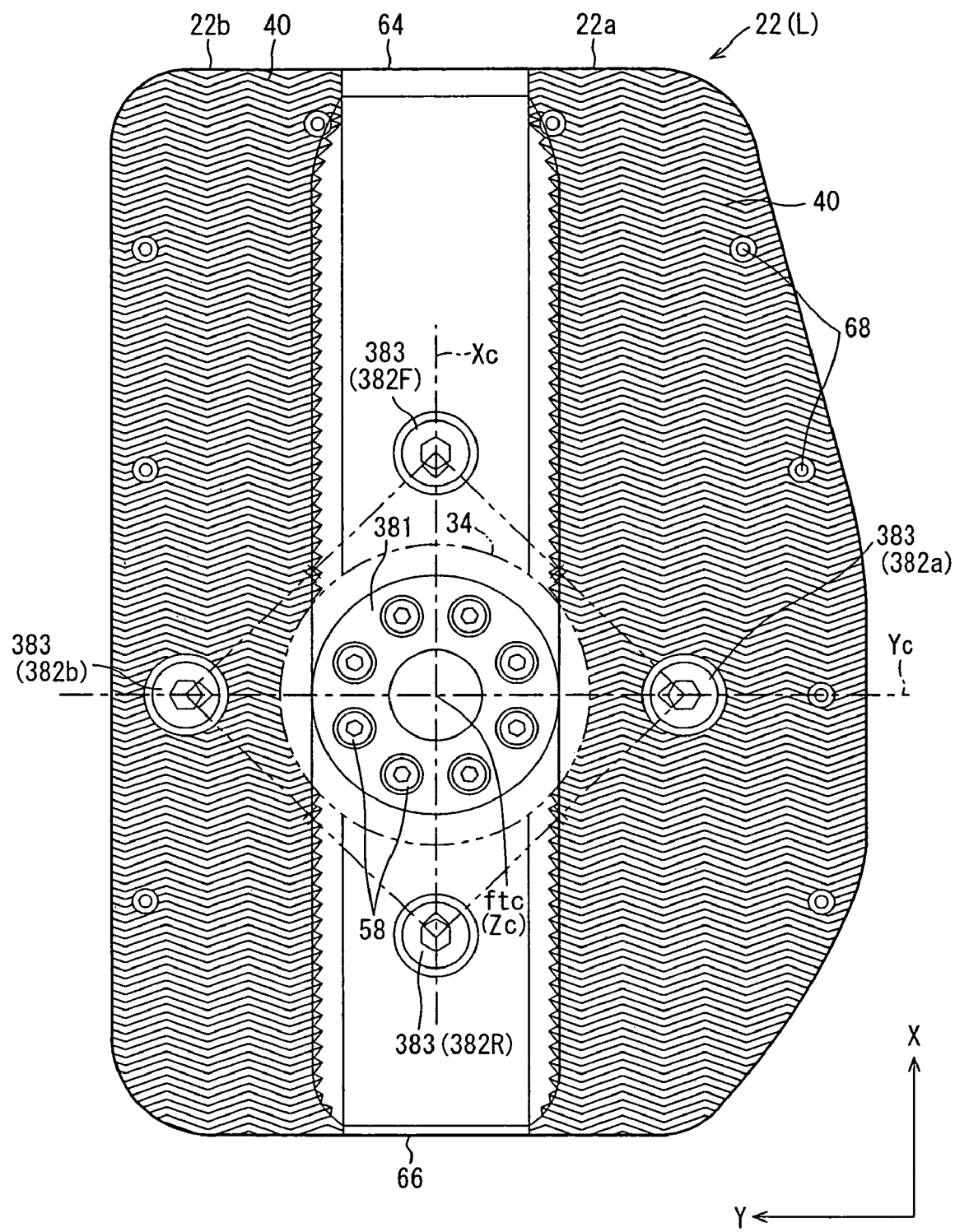
FIG. 3 is a bottom view showing the foot illustrated in FIG. 2.

FIG. 2 is an enlarged cross-sectional side view showing the structure of the left foot 22L (of the feet 22R, 22L) and FIG. 3 is a bottom view showing the left foot from its sole. Since the feet 22R, 22L are symmetrical with each other, the description to the right foot 22R is omitted and the addition of R and L is omitted in the following explanation unless it is needed.

As shown in FIG. 2, the six-axis force sensor 34 is fastened to a position between the ankle joint 18, 20 and the contact end of the foot 22, more precisely at a position between the ankle joint 18, 20 and the contact end (that comprises the spring mechanism 38, a sole frame 50, a sole plate 52 and the sole member 40). Since the six-axis force sensor 34 is thus installed at a position closer to the floor contact surface, detection accuracy is improved. In addition, since the floor-contact end is interposed between the six-axis force sensor 34 and the floor surface, it becomes possible to decrease influence of the impact at foot landing, and it becomes unnecessary to enhance rigidity of the six-axis force sensor 34.

Explaining this more specifically, the six-axis force sensor 34 is fastened, at its upper portion, to the crus link 30 at a location near the ankle joint 18, 20 by a plurality of upper portion fastening bolts 56, while being guided to that location by a gauge pin 54. The crus link 30 is made of metal (or alloy) such as titanium or magnesium alloy having high rigidity. The six-axis force sensor 34 is connected, at its lower portion, to the sole frame 50 (made of metal) through the spring mechanism 38.

The spring mechanism 38 comprises an inverted-Ω-like frame 381, a plurality of bush-like rubber members (each corresponding to aforesaid elastic member) 382 and bolts 383. The inverted-Ω-like frame 381 is made of aluminum (or its alloy) and has a recess, at its middle, whose inner space is almost the same as the lower portion of the six-axis force sensor 34. The six-axis force sensor 34 is fastened to the inverted-Ω-like frame 381 by a plurality of bolts 58 (more precisely eight bolts 58 as illustrated in FIG. 3) with its lower portion being inserted in the recess. With this, it becomes possible to install the six-axis force sensor 34 at the position closer to the floor contact surface and to improve the detection accuracy. The output of the six-axis force sensor 34 is sent to the control unit 26 over a harness 34a.

The bush-like rubber members 382 are four in numbers and each has an H-like shape in cross section. The four bush-like rubber members 382 are installed around the six-axis force sensor 34. The inverted-Ω-like frame 381 and the sole frame 50 are combined together, while sandwiching each indented middle portion of the H-like shape of the bush-like rubber members 382 by two of the bolts 383. The bush-like rubber members 382 are made of synthetic rubber and have appropriate elasticity.

With this, the impact acting on the six-axis force sensor 34 at foot landing, especially that acting thereon even from an inclined or slanted direction can also be decreased or mitigated by the deformation of the bush-like rubber member 382. The crus link 30 (to which the upper portion of the six-axis force sensor 34 is fastened) is made of metal having rigidity higher than the overall rigidity of the spring mechanism 38. This can further improve detection accuracy and does not degrade the performance of control, since the detected floor reaction force is equal to the floor reaction force actually acting on the robot. In addition, this can improve the posture stability during standing at which the load exerts on the robot in the direction of gravity.

A ring-like member 60 is interposed between the inverted-Ω-like frame 381 and the sole frame 50. The ring-like member 60 acts like a piston ring when the inverted-Ω-like frame 381 moves up and down inside the sole frame 50. As a result, the inverted-Ω-like frame 381 can move in the vertical direction smoothly without shaking. The ring-like member 60 is made of fluororesin such as polytetrafluoroethylene (PTFE) exhibiting high lubrication.

Continuing the explanation with reference to FIG. 3, the sole (foot sole surface) of the foot 22 has an almost rectangular shape and the six-axis force sensor 34 is installed at a position slightly rearward from the center in the front-and-back direction (in the direction of the X-axis). In the figure, "Xc" indicates the center line of sensitivity of the six-axis force sensor 34 in the direction of the X-axis, "Yc" indicates that in the direction of the Y-axis, and "Zc" indicates that in the direction of the Z-axis. These sensitivity center lines Xc and Yc orthogonally intersect the leg center line "ftc" in the direction of a Z-axis (as is best shown in FIG. 2) that is made equal to Zc. Thus, the six-axis force sensor 34 is installed in such a manner that the sensitivity center line Zc is made equal to the leg center line ftc. With this, it becomes possible to detect the floor reaction force acting on the robot 1 accurately.

It should be noted in the above that the front-and-back direction (the X-axis direction) is a direction in which the robot 1 advances, as will be understood from FIG. 1. The right-and-left (sidewise) direction is the Y-axis direction that orthogonally intersects the X-axis direction (advancing direction) and the Z-axis direction (direction of gravity).

The six-axis force sensor 34 is installed in such a manner that the sensitivity center line Zc thereof is positioned at the center of each pair of bush-like rubber members 382 (382F and 382R, or 382a and 382b, indicated by the bolts 383 also hidden behind the sole) that are arranged on straight lines to have a predetermined positional relationship with each other. Specifically, the sensor 34 is installed in such a manner that the sensitivity center line Zc thereof is positioned at the center of the two members 382F and 382R located in the advancing direction (X-axis direction), i.e., the sensitivity center line Xc, and at the center of the two members 382a and 382b in the right-and-left direction (Y-axis direction), i.e., the sensitivity center line Yc. Thus, the sensor 34 is installed in such a manner that its sensitivity center line Zc is positioned at the center of gravity or center of mass of a rectangle (more precisely a square with four equal sides) formed by the four bush-like rubber members 382 (382F, R, a, b).

With this, since it becomes possible to absorb the load (floor reaction force) acting from any direction in a same or uniform manner, posture stability, in particular, the posture stability in the advancing direction (X-axis direction) and right-and-left direction (Y-axis direction) during standing is improved and detection accuracy of the floor reaction force is further enhanced.

As mentioned above, in the legged mobile robots, in particular, in the biped mobile robots, since the robot foot lands normally from its heel, the heel or thereabout is likely to deteriorate.

For that reason, in this embodiment, rigidity of one or more of the bush-like rubber members 382 located at a position rearwards from the six-axis force sensor 34 in the advancing direction (X-axis direction) is made higher than that of the others located at a position forwards from the sensor 34. Since the sensitivity center line Zc is made equal to the leg center line ftc, the one or more of the members 382 is the one located at a position close to the heel, i.e., the member 382R. Thus, the rigidity of the heel or thereabout is improved by enhancing the rigidity of the bush-like rubber member 382R located at the position close to the heel, and the impact-absorbing effect is accordingly prevented from decreasing in the course of time, thereby enabling to avoid the degradation of the posture stability and floor reaction force detection accuracy.

Continuing the explanation, a foot portion 22a of the foot 22 of the robot 1 (outer than the sensitivity center line Xc of the six-axis force sensor 34) is gradually increased in area in the right-and-left direction (Y-axis direction) from a toe 64 towards the rear (in the front-and-back direction, i.e., the X-axis direction), reaches its maximum around the sensitivity center line Yc and is decreased towards a heel 66 so as to have a width similar to that of the toe 64. Here, since the foot 22 disclosed is the right one, the foot portion 22a is the outer one during standing, whilst the opposite one (indicated by reference numeral 22b) is the inner foot portion.

As mentioned above, the sensitivity center line Xc of the six-axis force sensor 34 intersects the leg center line ftc (as best shown in FIG. 3) at a right angle. In other words, the foot portion 22a outer than the sensitivity center line Xc of the foot 22 of the robot 1 is the foot portion outer than the leg center line ftc. This will also be applied to the inner foot portion 22b.

Thus, the area of the sole of the outer foot portion 22a outer than the leg center line ftc is made larger than that of the inner foot portion 22b. This can prevent the inner portion 22b from interfering with the other leg or foot and can assist to maintain the posture stability of the robot 1.

Further, as stated above, since the outer foot portion 22a (that is increased in area) experiences more load or spinning moment due to free leg swinging, it is apt to deteriorate. Taking this into account, in the embodiment, rigidity of one or more of the bush-like rubber members 382 (i.e., the member 382a) disposed at the outer foot portion 22a outer than the leg center line ftc is made higher than that of the others disposed at the inner foot portion 22b (i.e., the member 382b). Thus, the rigidity of the outer foot portion 22a is improved by enhancing the rigidity of the bush-like member 382a disposed at the outer foot portion 22a and the impact-absorbing effect is accordingly prevented from decreasing in the course of time, thereby enabling to avoid the degradation of the posture stability and floor reaction force detection accuracy.

The sole member 40 is a rubber material and is divided into two halves which are fastened on the sole by a plurality of bolts 68, more specifically nine bolts 68, leaving the sensitivity center line Xc and thereabout. With this, it becomes possible to decrease or absorb the impact acting on the robot 1 at foot landing and at the same time, to avoid slippage by an enhanced frictional force.

The ankle joint 18, 20 is made up of the joint 18 in the pitching axis and the joint 20 in the rolling axis, as mentioned above. The joint 18 of the ankle joint 18, 20 is driven by a rotational force generated and transmitted from the electric motor while reducing its speed by a reduction gear (not shown) so as to impart a desired motion to the foot 20 in the rolling axis (about the X-axis, more specifically about the sensitivity center line Xc, as shown in FIG. 2). The joint 20 of the ankle joint 18, 20 is also driven by a rotational force generated and transmitted from the electric motor (installed above the foot) through a belt 70 and a pulley 72, while reducing its speed by a reduction gear (not shown) so as to impart a desired motion to the foot 22 in the pitching axis (about the Y-axis, more specifically about the axis that orthogonally intersects the sensitivity center line Xc and the leg center line ftc).

With an intention of more effective space utilization, in this embodiment, a driver circuit 74 for driving the motors is stored in the foot 22 at a location around the toe close to a position at which the six-axis force sensor 34 is installed. However, as described above, when a control device or some similar device is accommodated in the inner space of the foot 22 at which the six-axis force sensor 34 is to be installed, there may be a possibility that current flow in the device influences on the floor reaction force detector through a foot frame (sole frame 50) as a noise. Moreover, since one of the electric motors is installed at the crus link 30 or thereabout, when the driver circuit 74 is thus stored inside the foot 22 at a location near the toe, and in addition when the driver circuit 74 is connected to the motor by a wire 76 in the manner illustrated in the figure, there may be similar possibility that current flow in the electric motor influences on the six-axis force sensor 34.

In this embodiment, therefore, it is arranged such that an insulator is installed around the six-axis force sensor 34. Specifically, a first insulator member 78 is interposed between the upper portion of the six-axis force sensor 34 and the crus link 30, whilst a second insulator member 80 is interposed between the lower portion of the six-axis force sensor 34 and the inverted-Ω-like frame 381.

The first and second insulator members are made of a material exhibiting excellent insulation and having high mechanical strength. The gauge pin 54 is made of a similar material.

Figure 4:
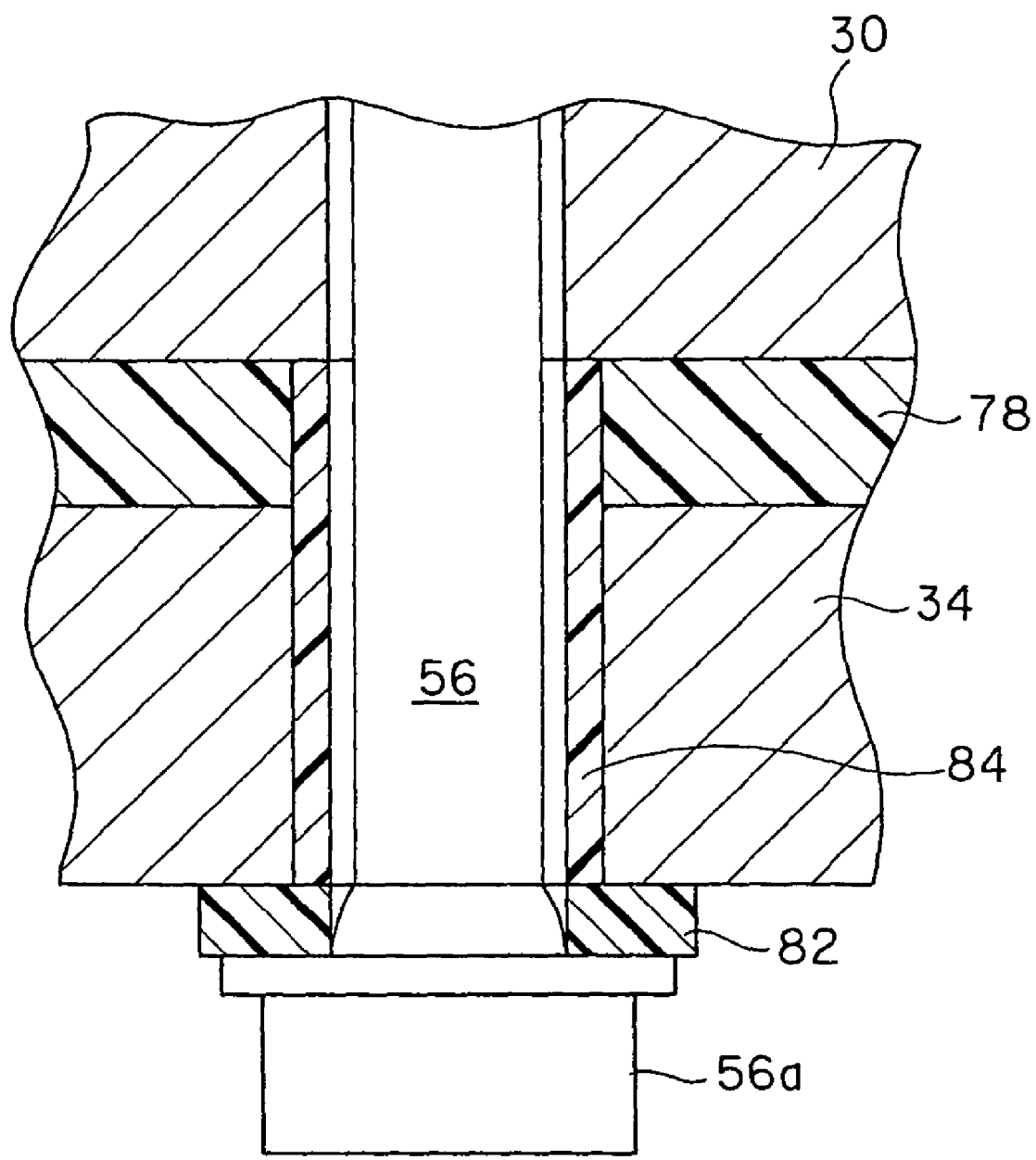
FIG. 4 is an enlarged partial cross-sectional view showing a portion of the foot illustrated in FIG. 2.

Further, as best shown in FIG. 4, a first insulating washer 82 is interposed between a head 56a of the bolt 56 (for fastening the sensor upper portion) and the six-axis force sensor 34. In addition, a first insulating sleeve 84 is installed around the bolt 56 and the first insulator member 78. With this, the six-axis force sensor 34 can be completely insulated from the crus link 30 and the bolt 56.

Figure 5:
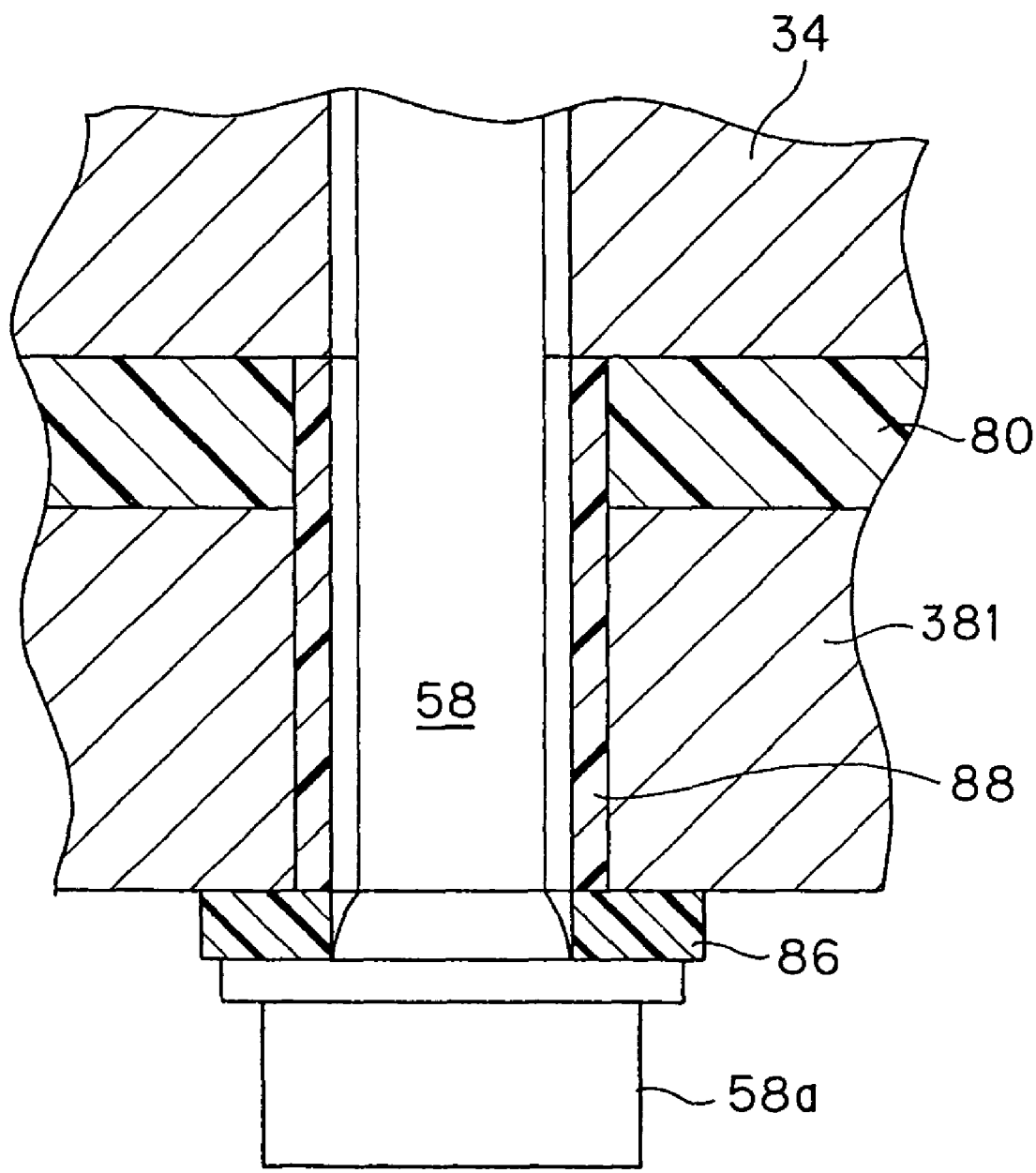
FIG. 5 is an enlarged partial cross-sectional view, similar to FIG. 4 and also showing the portion of the foot illustrated in FIG. 2.

Moreover, as best shown in FIG. 5, a second insulating washer 86 is interposed between a head 58a of the bolt 58 (for fastening the sensor lower portion) and the inverted-Ω-like frame 381. In addition, a second insulating sleeve 88 is installed around the second insulator member 80 and the inverted-Ω-like frame 381. With this, the six-axis force sensor 34 can be completely insulated from the inverted-Ω-like frame 381 and the bolt 58. The first and second insulating washers 82, 86 and the first and second insulating sleeves 84, 88 are similarly made of a material exhibiting excellent insulation and having high mechanical strength.

Since it is arranged such that the insulator is disposed around the six-axis force sensor 34, the sensor can be protected from the influence of current flow in the control device and the electric motor disposed thereabout.

Figure 6:
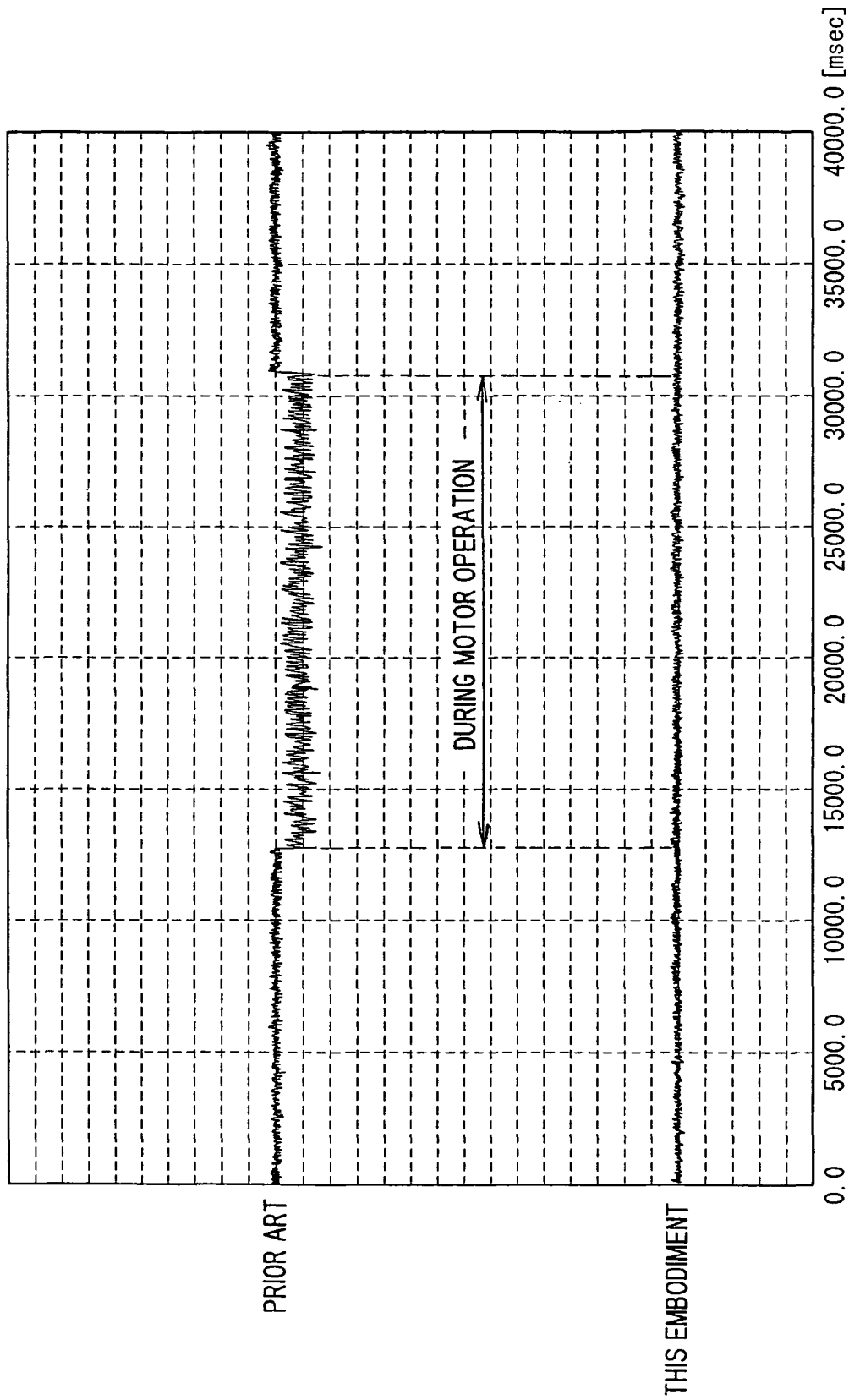
FIG. 6 is a graph showing the influence of noise of current flow in the floor reaction force detector of the legged mobile robot according to the embodiment in contrast with that of a prior art detector.

FIG. 6 is a graph showing the influence of noise of current flow in the six-axis force sensor 34 according to the embodiment in contrast with that of a prior art. As will be seen from the figure, the influence of noise during motor operation is solved almost completely in this embodiment.

It should be noted that, since the inverted-Ω-like frame 381 and the sole frame 50 are connected together while sandwiching the bush-like rubber members 382 therebetween, the influence of current that flows through the member 381 can be improved by enhancing insulation of the members 382. However, the degree of freedom in designing elasticity (i.e., the degree of freedom in selecting materials) will be ordinarily restricted if its insulation should be also taken into account and hence, it becomes difficult to achieve a desired performance of impact absorbing. Nevertheless, since they are connected by interposing the insulator as mentioned just above, such a difficulty is eliminated in this embodiment.

Then, a floor reaction force detector of a legged mobile robot according to a second embodiment will be explained with reference to FIG. 7.

Figure 7:
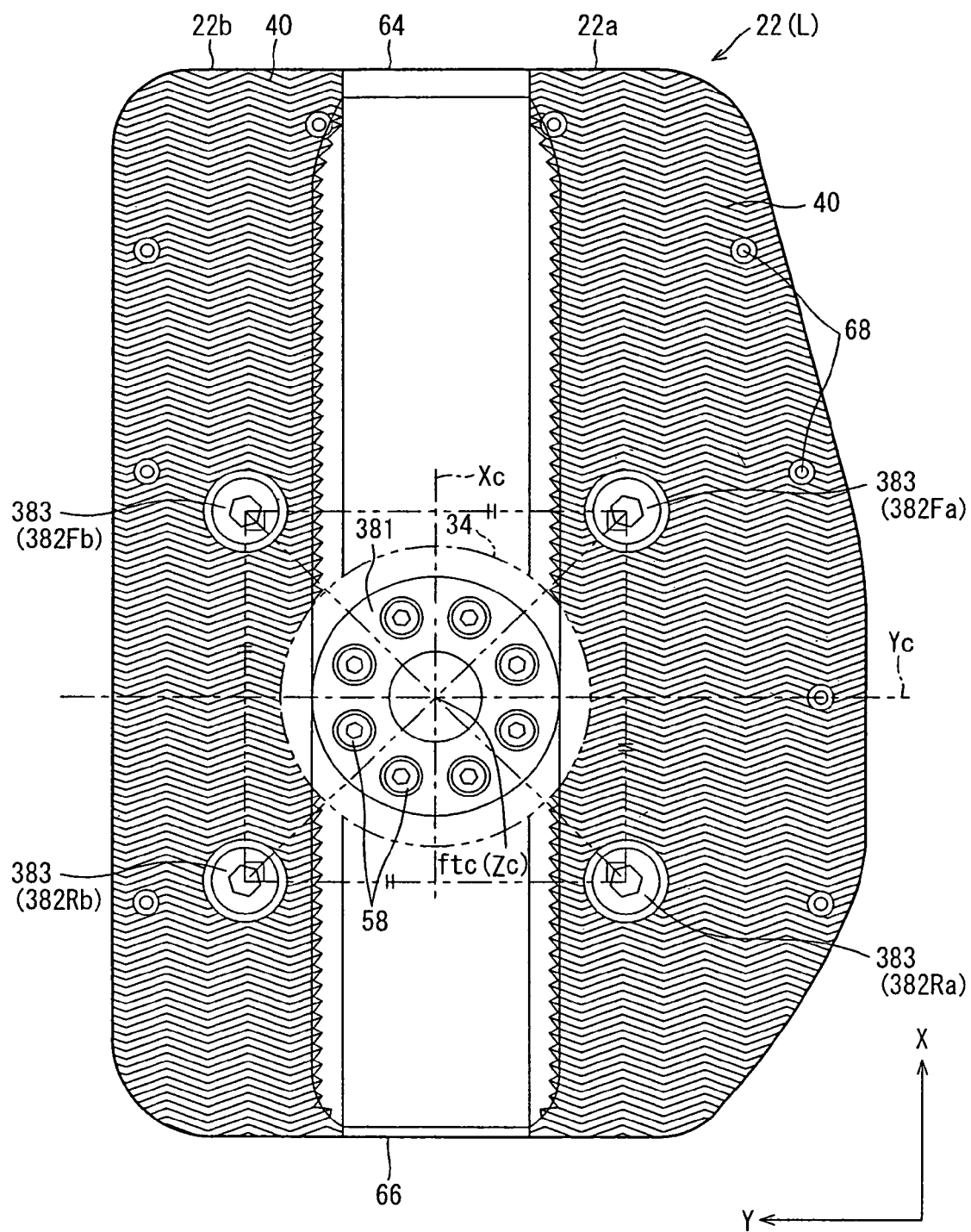
FIG. 7 is a view, similar to FIG. 3, but showing a floor reaction force detector of a legged mobile robot according to a second embodiment of the invention.

FIG. 7 is a view, similar to FIG. 3, but showing the left foot 22L of the feet 22R, 22L for explaining the floor reaction force detector of a legged mobile robot according to the second embodiment.

As illustrated in the figure, the six-axis force sensor 34 is also installed in such a manner that the sensitivity center line Zc thereof is positioned at the center between each pair of bush-like rubber members 382 (382Fa and 382Rb, or 382Fb and 382Ra; indicated by the bolts 383 also hidden behind the sole) that are arranged on the same straight line to have a predetermined positional relationship with each other. Thus, the sensor 34 is installed in such a manner that the sensitivity center line Zc thereof is positioned at the center of gravity or center of mass of a rectangle (more precisely a square with four equal sides) formed by the four bush-like rubber members 382 (382R, F, a, b). With this, it becomes possible to improve the posture stability and to improve detection accuracy.

Further, in this embodiment, rigidity of the bush-like rubber members 382Fa and 382Rb is made higher than that of the members 382Fb, and rigidity of the bush-like member 382Ra is made still higher than the members 382Fa and 382Rb. Thus, the rigidity of the heel and thereabout and the outer foot portion 22a is improved and the impact-absorbing effect is accordingly prevented from decreasing in the course of time, thereby enabling to avoid the degradation of the posture stability and floor reaction force detection accuracy.

Since the rest of the structure is the same as that of the first embodiment, no further explanation will be made.

Next, a floor reaction force detector of a legged mobile robot according to a third embodiment will be explained with reference to FIG. 8.

Figure 8:
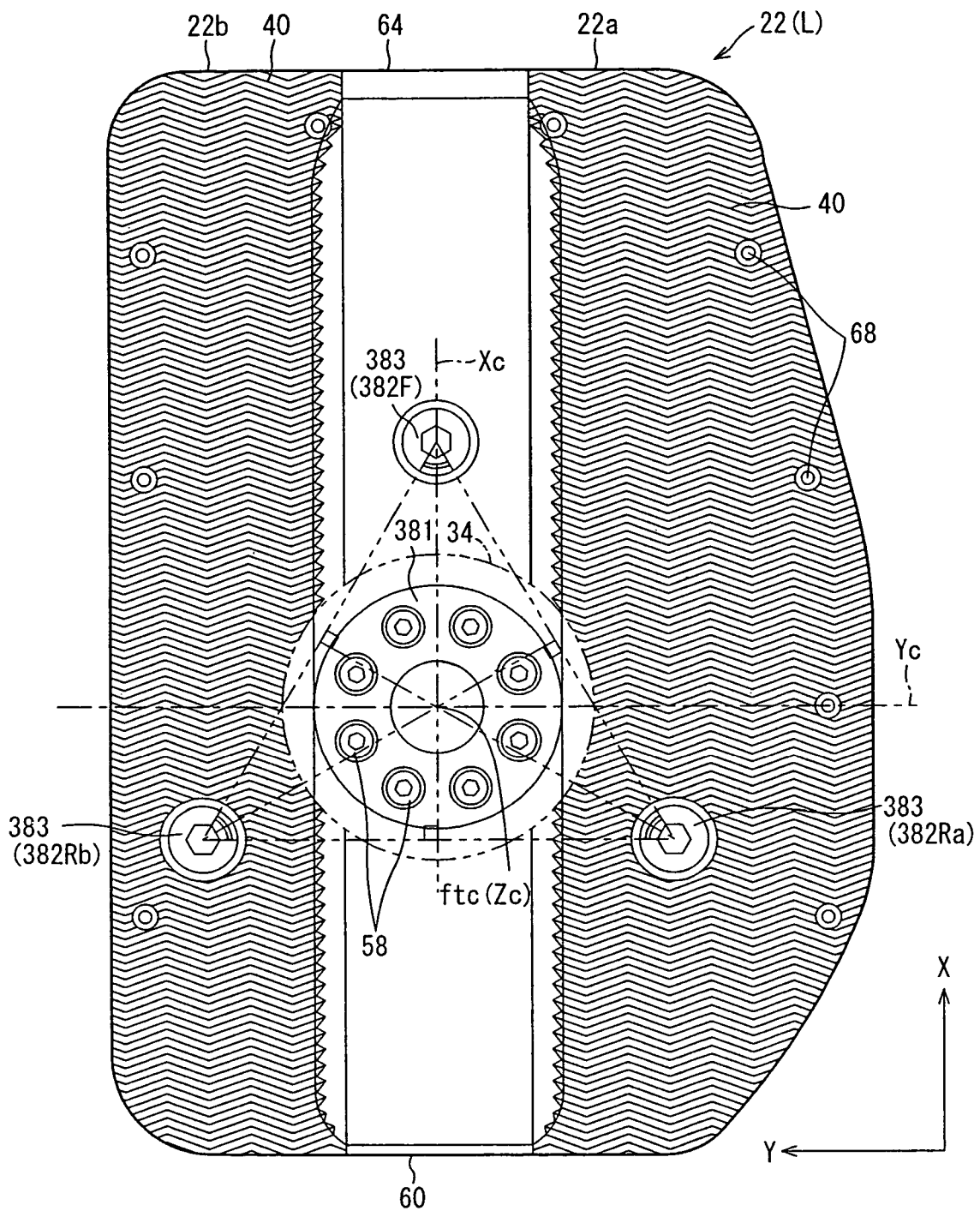
FIG. 8 is a view, similar to FIG. 3, but showing a floor reaction force detector of a legged mobile robot according to a third embodiment of the invention.

FIG. 8 is a view, similar to FIG. 3, but showing the left foot 22L of the feet 22R, 22L for explaining the floor reaction force detector of a legged mobile robot according to the third embodiment.

In the third embodiment, the six-axis force sensor 34 is installed in such a manner that the sensitivity center line Zc thereof is positioned at the center of gravity or center of mass of a triangle (more precisely a regular triangle with three equally angled vertexes), formed by the three bush-like rubber members 382 (382F, Ra, Rb). With this, it becomes possible to improve the posture stability and to improve detection accuracy.

Further, in this embodiment, rigidity of the bush-like rubber member Rb is made higher than that of the member 382F, and the bush-like member 382Ra is made still higher than that of the member 382Rb. Thus, the rigidity of the heel and thereabout and the outer foot portion 22a is improved and the impact-absorbing effect is accordingly prevented from decreasing in the course of time, thereby enabling to avoid the degradation of the posture stability and floor reaction force detection accuracy.

Since the rest of the structure is the same as that of the first embodiment, no further explanation will be made.

As mentioned above, the embodiments are arranged to have a floor reaction force detector (six-axis force sensor 34) of a legged mobile robot having at least a body 24 and a plurality of legs (leg links 2) each connected to the body through a first joint (joints 10, 12, 14R(L)), for detecting the floor reaction force acting from a floor surface through a contact end of each foot (spring mechanism 38, sole member 40, sole frame 50 and sole plate 52) connected to a distal end of each of the legs through a second joint (ankle joint (foot joint) 18, 20R(L)), characterized in that: the floor reaction force detector is installed between the second joint and the contact end of the foot.

With this, since the floor reaction force detector is installed between the second joint (more specifically, an ankle joint) and the contact end of the foot, the detector can thus been installed at a position closer to a floor contact surface, detection accuracy is improved. In addition, since the contact end of the foot is interposed between the detector and the floor surface, it becomes possible to decrease influence of the impact at foot landing, and it becomes unnecessary to enhance the rigidity of the detector.

And, one end of the floor reaction force detector is connected at a location near the second joint, and the contact end of the foot or thereabout is constituted by a member that is lower in rigidity than a member constituting the second joint or thereabout (crus link 30), such that other end of the floor reaction force detector is connected to the member having the lower rigidity.

With this, the foot can have appropriate elasticity, thereby enabling to decrease the influence of the impact at foot landing. Since a portion below the detector can have elasticity, while a portion above the detector (i.e., a portion closer to the body) can have high rigidity, this can further improve detection accuracy and does not degrade the performance of control, since the detected floor reaction force is equal to the floor reaction force actually acting on the robot.

Specifically, the member having the lower rigidity comprises a spring mechanism 38, and the floor reaction force detector is connected to the contact end of the foot through the spring mechanism.

With this, it becomes possible to achieve the same effects and advantages as those mentioned above and to decrease or mitigate the impact at foot landing even from an inclined or slanted direction, while enabling the robot to maintain a posture stability during standing (pause).

And the spring mechanism includes at least two of elastic members (bush-like rubber members 382), and the floor reaction force detector is installed between the at least two of elastic members.

With this, it becomes possible to further improve detection accuracy of the floor reaction force.

And the at least two of elastic members (bush-like rubber members 382F, R) are arranged in such a manner that they have a predetermined positional relationship with each other in a direction in which the robot advances (front-and-back direction), and the floor reaction force detector is installed between the elastic members arranged to have the predetermined positional relationship with each other.

With this, it becomes possible to enhance the posture stability during standing in the advancing direction (front-and-back direction).

And the at least two of elastic members (bush-like rubber members 382a, b) are arranged in such a manner that they have a predetermined positional relationship with each other in a direction (right-and-left direction (sidewise)) that orthogonally intersects the direction in which the robot advances and a direction of gravity, and the floor reaction force detector is installed between the elastic members arranged to have the predetermined positional relationship with each other.

With this, it becomes possible to enhance the posture stability during standing in the direction that orthogonally intersects the advancing direction and the direction of gravity (i.e., the right-and-left direction).

And, the spring mechanism includes n (n≧3) numbers of elastic members, and the floor reaction force detector is installed at a center of gravity of n-sided polygon whose vertexes are formed by the elastic members, when viewed from a sole of the foot.

With this, since it becomes possible to absorb the load (floor reaction force) acting from any direction in a same or uniform manner, the posture stability is improved and the detection accuracy of floor reaction force is further enhanced.

And, one of the elastic members (bush-like rubber members 382R, Ra, Rb) located at a position rearwards from the floor reaction force detector in a direction in which the robot advances, is made higher in rigidity than that (bush-like rubber members 382F, Fa, Fb) located at a position forwards from the floor reaction force detector in that direction.

With this, the rigidity of the heel or thereabout is improved and the impact-absorbing effect is accordingly prevented from decreasing in the course of time, thereby enabling to avoid the degradation of the posture stability and floor reaction force detection accuracy.

And, one of the elastic members (bush-like rubber members 382a, Fa, Ra) located at a position outer than the floor reaction force detector in a direction which orthogonally intersects the direction in which the robot advances and a direction of gravity (i.e., outer than the leg center line ftc), is made higher in rigidity than that (bush-like rubber members 382b, Fb, Rb) located at a position inner than the floor reaction force detector in that direction.

With this, the rigidity of the outer foot portion relative to the leg center line is improved and the impact-absorbing effect is accordingly prevented from decreasing in the course of time, thereby enabling to avoid the degradation of the posture stability and floor reaction force detection accuracy.

And an insulator (first and second insulator members 78, 80, first and second insulating washers 82, 86, first and second insulating sleeves 84, 88) is disposed around the floor reaction force detector.

With this, the detector can be protected from the influence of current flow in a control device and an electric motor disposed thereabout.

It should be noted in the above that, although the number of the bush-like rubber members is made three or four and the polygons formed thereof is made a triangle or a rectangular, the invention should not be limited thereto. It is alternatively possible to use more n (n≧3) number of members as desired. The triangle or rectangular should not be limited to a square or a regular triangle and the angles of convexes or the length of sides can therefore be determined as desired insofar as the six-axis force sensor 34 can be positioned at the center of gravity or thereabout of obtained polygons.

It should also be noted in the above that materials of the members should not be limited to those described. Needless to say, they can be selected as desired.

It should further be noted in the above that rigidity of the bush-like rubber members is made different depending upon its location. This can be made by changing material of the member or by changing its shape.

It should further be noted that in the above that, although the invention has been described with reference to a biped mobile robot, the invention can also be applied to any other legged mobile robots having legs of three or more.

INDUSTRIAL FIELD IN WHICH THE INVENTION IS APPLICABLE

According to the invention, there is provided a floor reaction force detector of legged mobile robot which can improve detection accuracy so as not to degrade the performance of control, and can decrease influence of the impact generated at foot landing, while enabling to maintain a stable posture at standing. In biped mobile robots, in particular, the durability of heel or thereabout and a portion of the foot outer than the leg center line is enhanced such that decrease of the impact-absorbing effect at foot landing in the course of time is avoided, thereby enabling to avoid the degradation of the posture stability and detection accuracy of the floor reaction force. In addition, the detector can be protected from the influence of current flow in a control device and an electric motor disposed thereabout.

The invention claimed is:

1. A floor reaction force detector of a legged mobile robot having at least a body and a plurality of legs each connected to the body through a first joint, for detecting the floor reaction force acting from a floor surface through a contact end of each foot connected to a distal end of each of the legs through a second joint, wherein the improvement comprises:

the floor reaction force detector is installed between the second joint and the contact end of the foot, and one end of the floor reaction force detector is connected at a location near the second joint, and the contact end of the foot or thereabout is constituted by a first member that is lower in rigidity than a second member constituting the second joint or thereabout, such that other end of the floor reaction force detector is connected to the first member having the lower rigidity, wherein the first member having the lower rigidity comprises a spring mechanism, and the floor reaction force detector is connected to the contact end of the foot through the spring mechanism, wherein the spring mechanism includes at least two of elastic members and a concave frame, and the floor reaction force detector is attached to the concave frame with a lower portion of the floor reaction force detector being inserted in a recess of the concave frame wherein an insulator is disposed around the floor reaction force detector wherein the insulator comprises a first insulator member and a second insulator member, and wherein the first insulator member is disposed above the floor reaction force detector, and the second insulator member is disposed between the concave frame and the floor reaction force detector.

2. A detector according to claim 1, wherein the at least two of elastic members are arranged in such a manner that they have a predetermined positional relationship with each other in a direction in which the robot advances, and the floor reaction force detector is installed between the elastic members arranged to have the predetermined positional relationship with each other.

3. A detector according to claim 1, wherein the at least two of elastic members are arranged in such a manner that they have a predetermined positional relationship with each other in a direction that orthogonally intersects the direction in which the robot advances and a direction of gravity, and the floor reaction force detector is installed between the elastic members arranged to have the predetermined positional relationship with each other.

4. A detector according to claim 1, wherein the spring mechanism includes n (n≧3) numbers of elastic members, and the floor reaction force detector is installed at a center of gravity of n-sided polygon whose vertexes are formed by the elastic members, when viewed from a sole of the foot.

5. A detector according to claim 1, wherein one of the elastic members located at a position rearwards from the floor reaction force detector in a direction in which the robot advances, is made higher in rigidity than that located at a position forwards from the floor reaction force detector in that direction.

6. A detector according to claim 2, wherein one of the elastic members located at a position rearwards from the floor reaction force detector in a direction in which the robot advances, is made higher in rigidity than that located at a position forwards from the floor reaction force detector in that direction.

7. A detector according to claim 4, wherein one of the elastic members located at a position rearwards from the floor reaction force detector in a direction in which the robot advances, is made higher in rigidity than that located at a position forwards from the floor reaction force detector in that direction.

8. A detector according to claim 1, wherein one of the elastic members located at a position outer than the floor reaction force detector in a direction which orthogonally intersects the direction in which the robot advances and a direction of gravity, is made higher in rigidity than that located at a position inner than the floor reaction force detector in that direction.

9. A detector according to claim 3, wherein one of the elastic members located at a position outer than the floor reaction force detector in a direction which orthogonally intersects the direction in which the robot advances and a direction of gravity, is made higher in rigidity than that located at a position inner than the floor reaction force detector in that direction.

10. A detector according to claim 4, wherein one of the elastic members located at a position outer than the floor reaction force detector in a direction which orthogonally intersects the direction in which the robot advances and a direction of gravity, is made higher in rigidity than that located at a position inner than the floor reaction force detector in that direction.

* * * * *